United States Patent Office 3,357,316
Patented Dec. 12, 1967

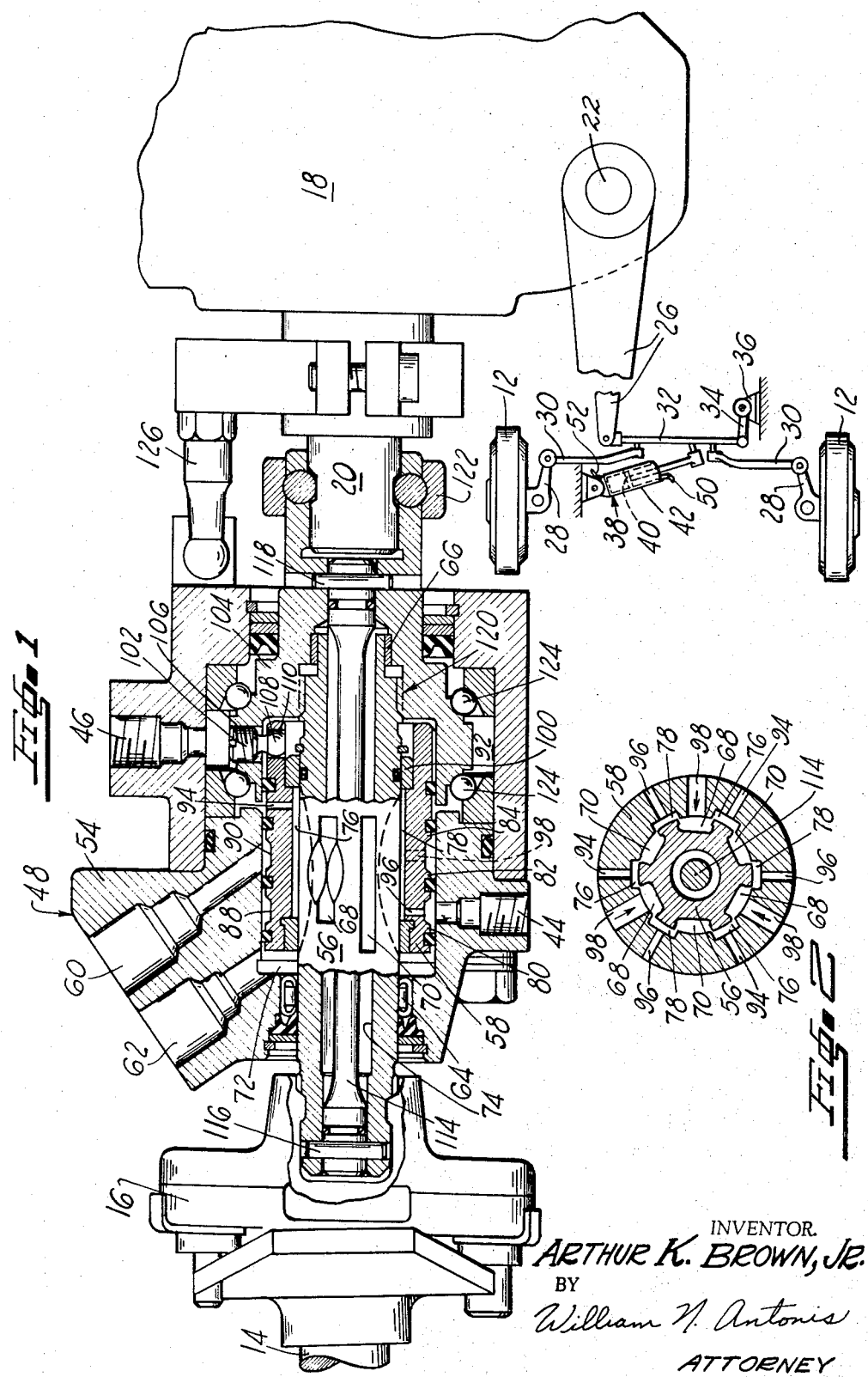

3,357,316
POWER STEERING MECHANISM
Arthur K. Brown, Jr., South Bend, Ind., assignor to The Bendix Corporation, a corporation of Delaware
Filed Oct. 21, 1965, Ser. No. 500,021
7 Claims. (Cl. 91—375)

ABSTRACT OF THE DISCLOSURE

The following relates to a power steering rotary valve unit which is co-axially aligned with and located between the steering shaft and the input shaft of the steering gear. The valve unit is mounted and supported solely on the steering gear input shaft through a bearing arrangement which permits the valve housing to, in effect, float on the bearings and prevents binding between the valve rotor and sleeve would could otherwise result from side loadings of the steering gear input shaft.

---

For many years, there has been a need for a power steering mechanism wherein the power steering valve could be easily mounted above the manual steering gear in conventional steering columns. In previous attempts one of the major problems was being able to mount the same type of rotary valve unit on different manufacturers' steering gears.

Accordingly, it is an object of this invention to provide a power steering mechanism wherein the same type of rotary valve unit can be easily mounted on most all types of steering gears.

More specifically, it is an object of this invention to provide a power steering mechanism wherein the valve unit is mounted and supported on the steering gear input shaft rather than bolted on to the steering gear housing as has been done in the past.

The above and other objects and features of this invention will be apparent from the following description of the mechanism taken in connection with the accompanying drawings which form a part of this specification and in which:

FIGURE 1 is a view, partially in section, of a power steering mechanism constructed in accordance with the present invention which is shown in association with parts of the vehicle drawn schematically; and FIGURE 2 is a composite sectional view which shows the passages of the power steering valve moved into the same plane for purposes of more clearly illustrating the flow paths within the valve.

Referring to FIGURE 1 it will be seen that reference numeral 12 designates the front wheels of a vehicle to be steered by rotation of steering shaft 14. A conventional steering gear unit 18 having an input member 20 and an output member 22 is located at the lower end of the steering column. A pitman arm 26 is suitably connected to the output member and to the spindle arms 28 of the wheels 12 through a steering linkage assembly which includes tie rods 30, a cross tie rod 32, and an idler arm 34 suitably pivoted at one end to the vehicle frame 36.

The hydraulic system of the power steering mechanism includes a fluid motor 38 which is connected between the cross tie rod 32 and the vehicle frame 36, as shown in FIGURE 1. A piston 40 divides cylinder 42 into opposed chambers constantly communicating respectively with cylinder ports 44 and 46 of rotary valve unit 48 via conduits 50 and 52.

The main components of the rotary valve 48 are the two part valve housing 54, the rotor 56 and the sleeve 58 which is located between the rotor and valve housing. The rotor is connected to the steering shaft 14 through means of a coupling 16. Located in the housing 54 are inlet port 60, outlet port 62 and the two previously mentioned cylinder ports 44 and 46. It will be noted that the valve rotor has one end thereof which rotates on needle roller bearings 64 while the other end thereof rotates on a bronze bearing 66. The rotor 56 contains six axially extending equally spaced slots formed on the outer periphery thereof, three of which are pressure slots and are designated by the reference numeral 68 and the other three of which are return slots and are designated by the reference numeral 70. It will be noted that the return slots 70 are longer than the pressure slots 68 so that the return slots may communicate with a return chamber 72 located at one end of sleeve 58. By utilizing long return slots 70 which communicate directly with the return chamber 72, it is possible to eliminate the necessity for drilling radial holes into and out of the bore 74 of the rotor for achieving such communication and thereby also eliminate fluid surges against sleeve 58 caused by such radial holes which tend to cause sleeve vibrations.

Located on the inner periphery of valve sleeve 58 are six axially extending equally spaced slots, three of which are designated by the reference numeral 76 and the other three of which are designated by the reference numeral 78. Formed on the outer periphery of valve sleeve 58 are three annular lands 80, 82 and 84 and two annular grooves 88 and 90. With the arrangement shown, it is possible to communicate the cavity 92 with sleeve slots 76 via radially extending passages 94 without the necessity for utilizing an annular groove on the valve sleeve, since radially extending passages 94 open directly into the cavity. On the other hand, radially extending passages 96 communicate sleeve slots 78 with annular groove 88. Radially extending passages 98 communicate rotor slots 68 with annular groove 90. Thus, it can be seen from the drawing that when the rotary valve 48, which is an open center valve, is in a neutral straight ahead position, flow will occur from the inlet port 60 to outlet 62 via annular groove 90, radially extending sleeve passages 98, axially extending rotor slots 68, axially extending sleeve slots 76 and 78, axially extending rotor slots 70 and return chamber 72. Cylinder port 44 communicates with sleeve slot 76 via radial sleeve passages 96 and annular groove 88 whereas cylinder port 46 communicates with sleeve slots 76 via radial passages 94 and cavity 92.

Seals are located in annular lands 80, 82 and 84 to prevent leakage thereacross. These seals are glass filled "Teflon" endless sealing rings of rectangular section. Stop-off rings 100 seal off the axially extending sleeve slots 76 and 78 and also serve as bearings.

An eccentric screw 102, as shown in FIGURE 1, is used to key the valve sleeve 58 directly to a bearing extension member 104, the purpose of which will be hereafter described. The eccentric screw is threaded into the bearing extension member at one end 106 and has the other spherical head end 108 extending into and in contact with the wall of a close fitting cylindrical hole 110, said hole being drilled into the end of valve sleeve 58. The eccentric screw 104 may be rotated by means of an Allen wrench, inserted through port 46, so that the valve may be "trimmed." In other words, turning of the eccentric screw causes rotation of the sleeve with respect to the bearing extension member 104. Since index is held between the valve rotor 56 and member 104 by means of torsion bar 14, which is pinned at one end 116 to the rotor 56 and at the other end 118 to the bearing extension member, this adjustment also rotates the sleeve with respect to the rotor, thereby permitting balancing of the pressures on opposite sides of piston 40.

A mechanical drive-through spline type connection 120 is provided between the valve rotor 56 and the bearing extension member 104 which will result in a direct mechanical drive between the steering shaft and the bearing extension member in the event of power failure. At all other times, this connection will permit limited relative rotary motion between the steering shaft and the extension member. The torsion rod 114 which connects the valve rotor 56 and extension member 104 provides mechanical "feel" without preventing the necessary angular movement required between the sleeve and rotor for valve operation.

The three equally spaced flow paths previously described give balanced forces within the valve due to fluid flow, thereby eliminating any stickiness due to hydraulic unbalance. Upon rotation of the steering wheel the valve rotor 56 is rotated relative to the valve sleeve 58 as a result of deflection of the torsion rod 114 which connects the valve rotor and the steering gear. This movement is in proportion to the input torque. As can more clearly be seen by reference to FIGURE 2, relative rotation between valve rotor 56 and valve sleeve 58 will cause one of the cylinder ports 44, 46 to communicate with the inlet port 60 and the other cylinder port to communicate with the outlet port 62. This will create a differential pressure across piston 40 and will result in power assisted steering.

It will be noted that the rotary valve unit 48, which is coaxially aligned with and located between the steering shaft 14 and the input member 20 of the steering gear unit 18, is mounted and supported on extension member 104. This extension member has one end thereof located externally of the valve unit, which is suitably attached to the steering input member by means such as split clamp 122, and the other end thereof located internally of the valve unit for supporting same through means of ball bearings 124. Such an arrangement, in effect, permits the valve housing to float on the bearings and eliminates binding between the valve rotor and sleeve which could otherwise result from side loadings of the steering gear input member. With the valve unit mounted on the steering gear input as shown, no connection between the valve housing and steering gear housing is needed insofar as operation of the valve is concerned. However, if desired, a torque arm 126 suitably connected to the gear housing and valve housing may be utilized to prevent the valve housing from rotating. In actual practice, it has been found that the rigidity of the fluid hoses in and of themselves, if anchored to any fixed vehicle member, such as the wheel well, is sufficient to prevent the valve housing from rotating.

The several practical advantages which flow from this novel shaft mounted rotary valve combination are believed to be obvious from the above description and other advantages may suggest themselves to those who are familiar with the art to which this invention relates.

Having thus described the various features of the invention, what I claim as new and desire to secure by Letters Patent is:

1. In a power steering mechanism for a vehicle the combination of a steering shaft, a steering gear having an input member and an output member, a valve unit coaxially aligned with and located between said steering shaft and said input member, and means for supporting said valve unit solely on said input member, said valve unit having a housing and a pair of relatively rotatable telescoped tubular elements through which fluid flow to and from said motor is controlled, one of which is connected to and rotatable with said steering shaft and the other of which is connected to said input member through said supporting means.

2. The combination, as defined in claim 1, wherein said means includes an extension member, one end of which is located externally of said valve unit and is clamped to said input member and the other end of which is located internally of said valve unit for supporting said valve unit.

3. The combination, as defined in claim 2, wherein bearing means are located between the supporting end of said extension member and the housing of said valve unit.

4. The combination, as defined in claim 3, wherein the supporting end of said extension member has bearing race means formed thereon.

5. The combination, as defined in claim 4, wherein the outer telescoped tubular element of said valve unit is connected to said extension member through means of a pin.

6. The combination, as defined in claim 5, wherein anchor means are operatively connected to the housing of said valve unit and a fixed vehicle member to prevent rotation of said housing.

7. The combination, as defined in claim 6, wherein said fixed vehicle member is the steering gear housing and said anchor means is a torque arm rigidly connected to said valve housing and steering gear housing.

References Cited

UNITED STATES PATENTS

| 2,978,056 | 4/1961 | Clements et al. | 180—1 |
| 3,033,051 | 5/1962 | Reinke et al. | 91—375 |
| 3,138,069 | 6/1964 | Bishop | 91—375 |
| 3,145,626 | 8/1964 | Vickers et al. | 91—375 |
| 3,162,263 | 12/1964 | Brown | 91—375 |
| 3,273,465 | 9/1966 | Eddy | 91—375 |
| 3,296,940 | 1/1967 | Eddy et al. | 91—375 |

EDGAR W. GEOGHEGAN, *Primary Examiner.*

PAUL E. MASLOUSKY, *Examiner.*